SUBSCRIPTION TELEVISION SYSTEM

Filed Aug. 9, 1951 4 Sheets-Sheet 1

INVENTORS:
WALTER S. DRUZ
ERWIN M. ROSCHKE
BY Francis W. Crotty
THEIR ATTORNEY.

SUBSCRIPTION TELEVISION SYSTEM

Filed Aug. 9, 1951 4 Sheets-Sheet 2

*INVENTORS:*
WALTER S. DRUZ
ERWIN M. ROSCHKE
BY Francis W. Crotty
THEIR ATTORNEY Aug. 12, 1958 W. S. DRUZ ET AL 2,847,500

SUBSCRIPTION TELEVISION SYSTEM

Filed Aug. 9, 1951 4 Sheets-Sheet 3

*INVENTORS:*
WALTER S. DRUZ
ERWIN M. ROSCHKE
BY Francis W. Crotty
THEIR ATTORNEY.

Aug. 12, 1958 W. S. DRUZ ET AL 2,847,500

SUBSCRIPTION TELEVISION SYSTEM

Filed Aug. 9, 1951

4 Sheets-Sheet 4

INVENTORS:
WALTER S. DRUZ
ERWIN M. ROSCHKE
BY Francis W. Crotty
THEIR ATTORNEY.

United States Patent Office 2,847,500
Patented Aug. 12, 1958

2,847,500

SUBSCRIPTION TELEVISION SYSTEM

Walter S. Druz, Chicago, and Erwin M. Roschke, Broadview, Ill., assignors to Zenith Radio Corporation, a corporation of Delaware Application August 9, 1951, Serial No. 241,081

12 Claims. (Cl. 178—5.1)

This invention relates to subscription-type signalling systems, and more particularly to subscription-type television transmitting and receiving systems.

One prior-art form of communication system adaptable for secrecy or subscription transmission comprises an arrangement for deriving from a signal to be coded, and having frequency components extending over a predetermined frequency band, another signal including a plurality of frequency-component subbands corresponding to individual portions of the aforesaid band. The frequency-component subbands of the latter signal are successively modified relative to each other in a predetermined order effectively to encode the transmitted signal. An authorized receiver is equipped with means for intercepting the transmitted signal and means for reorganizing the subbands to derive the first-mentioned signal.

The foregoing system employs a plurality of band-pass filters for separating the initial signal into the plurality of subbands comprising the second signal. It is not practically feasible to construct a filter having a frequency-attenuation characteristic including a portion of substantially infinite slope and, consequently, the plurality of subbands, as modified in frequency for the coded signal, usually have overlapping sections in the frequency spectrum. These might be termed areas of confusion, for they may not be satisfactorily interpreted, or the frequency components separated, in a receiver employing conventional circuitry.

This limitation does not handicap utilization of the described system for voice signals. However, because the areas of confusion tend to impair frequency and phase fidelity in a video system, the prior arrangement may not be completely satisfactory for coding a television signal.

It is an object of the present invention, therefore, to provide a novel subscription-type television system similar in some respects to the described prior arrangement, but in which the above-defined areas of confusion may be interpreted.

It has been found that the video signal generated by line scanning a subject includes frequency components clustered in the frequency spectrum at successive multiples of the line-scanning frequency. Substantially no frequency components lie between adjacent clusters and additional information may be there interposed for simultaneous transmission without increasing the over-all bandwidth requirements of the video channel.

In applying this phenomenon to a line-interlaced television system in which a frame is comprised of two fields, it has been found that the frequency components of basic video information may be separated from the frequency components of the added information if the added components are related to an odd multiple of one-half the line-scanning frequency. Specifically, with that relationship, the added information appears on the screen of the image-reproducing device with opposite phase during first and third fields and with opposite phase during second and fourth fields. The persistence of the phosphor of the image-tube screen and the persistence of vision of the observer's eye substantially integrate to zero the added information while the basic video signal produces an image in the usual manner. This type of filtering action is termed "psychological filtering." Conversely, by operating on the incoming combined signal with a heterodyning signal having a frequency equal to one-half the line-scanning frequency, the additional information may be derived on the image-reproducing device and the basic video signal integrated out. Thus, it is possible to transmit simultaneously and intercept and separate two signals, the absolute frequency ranges of which may overlap.

It is a more specific object of the invention to provide a novel subscription-type television system incorporating the prior-art subband-modifying communication system described hereinbefore and employing interposed frequency-component transmission together with psychological filtering to interpret the areas of confusion attributable to the overlap of subbands.

A subscription type television system in accordance with the invention comprises a source of video-frequency components extending over a predetermined frequency band and occurring during trace intervals having a given repetition frequency. Means are provided for deriving from the video source one signal including frequency components in a selected fractional portion of the video-signal frequency band and another signal including frequency components of the remainder of the band. A frequency-changer is coupled to the signal-deriving means and includes a source of heterodyning signal having a frequency substantially equal to an odd multiple of one-half the repetition frequency of the video-trace intervals. The frequency changer shifts the frequency components of the aforesaid one signal into interleaving relation with those of the other signal. A mixer, coupled to the signal-deriving means and to the frequency-changer, combines the one signal, as shifted in frequency, with the other signal to produce a third signal. The system also includes means for radiating a subscription program signal coupled to the mixer and a coding device completes a signal path for the aforesaid third signal to the radiating means. The system further includes a receiver for intercepting the subscription program signal and means, responsive to the subscription program signal, for deriving the first-named video signal for reproduction.

The features of the present invention which are believed to be novel are set forth with particularity in the appended claims. The present invention itself, both as to its organization and manner of operation, together with further objects and advantages thereof may best be understood by reference to the following description taken in connection with the accompanying drawings in which:

Fig. 1 is a block diagram of a subscription television transmitter constructed in accordance with the invention;

Fig. 2 comprises various curves illustrating the operation of the circuit of Fig. 1;

Figure 9:
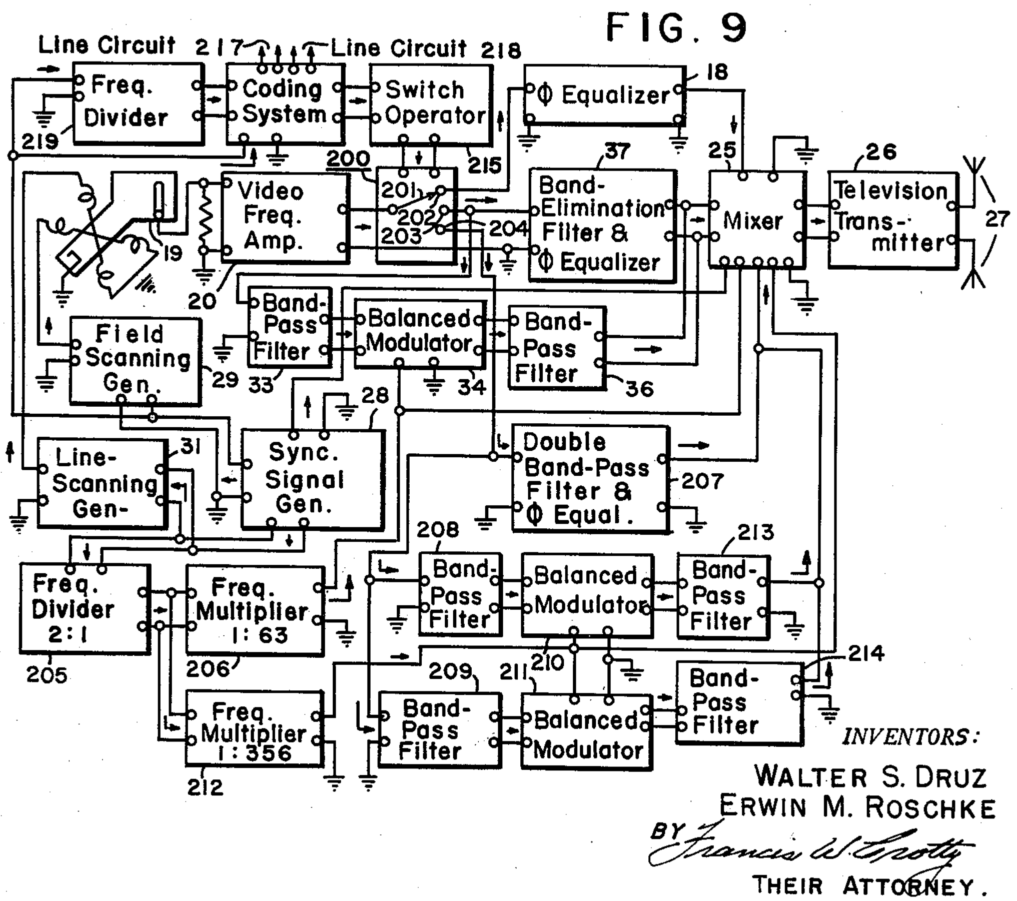
Fig. 9 is a block diagram of a subscription type television transmitter in accordance with still another embodiment of the invention.
Figure 10:
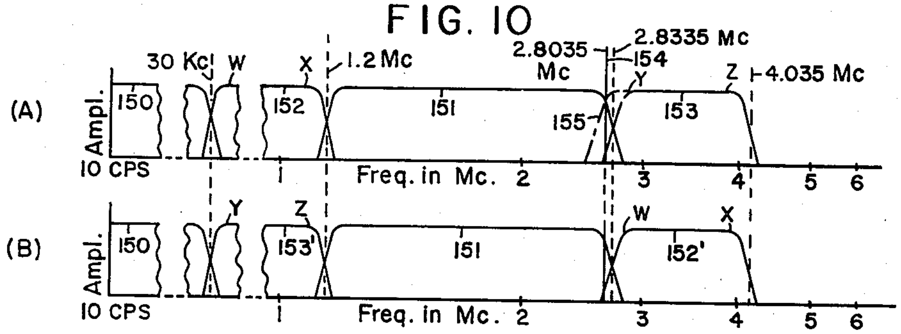
Figure 11:
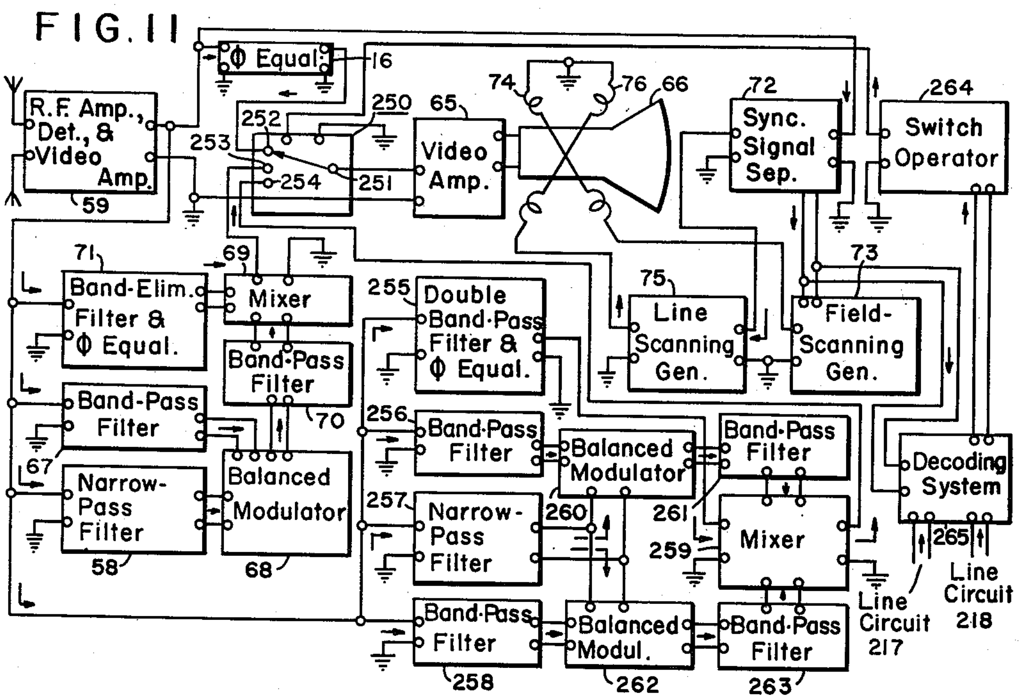

Fig. 10 comprises various curves illustrating the operation of the circuit of Fig. 9; and, Fig. 11 is a block diagram of a subscription type receiver which may be employed together with the transmitter of Fig. 9.

Figure 1:
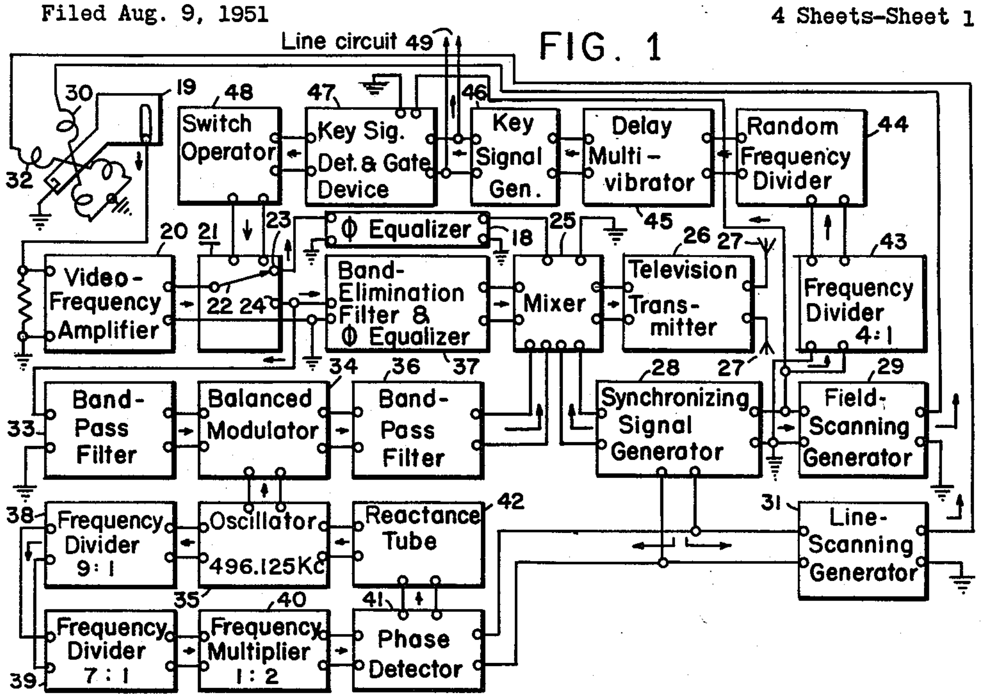

Referring now more particularly to Fig. 1, the arrangement there illustrated is a subscription type television transmitter for deriving coded television signals by shifting in frequency, preferably during spaced operating intervals and according to a coding schedule, a selected portion of the frequency components of the video-frequency band. The transmitter comprises a video-frequency signal generator 19 of the iconoscope or other well known type connected to a video-frequency amplifier 20. One output terminal of the amplifier is grounded and the other is connected to the movable arm 22 of a single-pole double-throw switch 21 including fixed contacts 23 and 24. Switch 21 has been illustrated as a mechanical device; however, it is to be understood that any known form of electronic switch which functions in a similar manner may be employed. Specifically, switch 21 has two operating conditions, one in which arm 22 completes an electrical circuit to terminal 23 and another in which arm 22 is displaced into circuit engagement with terminal 24. Terminal 23 is connected to one input terminal of a mixer 25 through a phase-equalizing network 18 and the other terminal of the mixer is grounded. Mixer 25 may be of any well known construction employed for combining video and synchronizing signals and/or different bands of frequencies within the video frequency spectrum. The output circuit of mixer 25 is coupled to a television transmitter 26 which includes the usual radio-frequency and modulator stages. The output terminals of unit 26 may be connected to any suitable antenna circuit 27.

The transmitter also includes a synchronizing-signal generator 28 connected to another input circuit of mixer 25 to supply line and field-synchronizing and blanking pulses thereto in well known manner. One set of output terminals of generator 28 is connected to a field-scanning generator 29, in turn, connected to field-deflection elements 30 associated with video-signal generator 19. Another set of output terminals of generator 28 is connected to a line-scanning generator 31, in turn, coupled to line-deflection elements 32 of camera tube 19.

The portion of the transmitter thus far described is conventional, except for switch 21, and its operation is well understood in the art. Briefly, as the line and field-scanning generators 29 and 31 cause the electron beam within iconoscope 19 to sweep the target within the tube, a video signal is generated during tracing intervals having a repetition frequency corresponding to that of line-scanning generator 31. The video signal has frequency components extending over a predetermined frequency band. For convenience of explanation it is assumed that this frequency band extends from 10 cycles per second to slightly more than 4 megacycles, as represented by curve 50 of Fig. 2A, that line-interlaced scanning is employed, that the line frequency is 15,750 cycles per second and the frame frequency is 60 cycles per second. The frequency components thus developed by video source 19 are applied to amplifier 20 wherein they are amplified and supplied to mixer 25 for combination with field and line-synchronizing signals. This composite signal then modulates a radio-frequency carrier in stage 26 and is radiated by antenna 27.

The operating condition just described may be termed a "normal mode" in which the television signal is unaltered, that is, it conforms precisely to the specifications prescribing the radiation of commercial telecasts. To practice subscription transmission, it is necessary to alter the television signal in such a manner that only receivers that have subscribed to the service are able to utilize the radiated signal. For this purpose, the transmitting system of Fig. 1 includes a first band-pass filter 33 arranged to pass, substantially without attenuation, a frequency band extending from approximately 31.5 kilocycles to 464 kilocycles. This pass-band is illustrated by the dash-dot curve 51 of Figure 2B. One input terminal of filter 33 is grounded and the other is connected to contact 24 of switch 21. The output circuit of filter 33 is coupled to one input circuit of a balanced amplitude modulator 34 having another input circuit to which an oscillator 35, which generates a signal frequency of 496.125 kilocycles, is connected. Modulator 34 may be of any known variety which effectively cancels one of the input signals; in this case those components supplied through band-pass filter 33 are cancelled. The output circuit of modulator 34 is coupled to a second band-pass filter 36 which has a band-pass characteristic substantially like that of filter 33, but of greater frequency range to include the frequency of oscillator 35 as shown by extension 51' of curve 51 wherein the signal frequency of the oscillator is indicated by vertical line 57. The filter is, in turn, connected to another set of input terminals of mixer 25. Mixer 25 has still another set of input terminals to which the output circuit of a band-elimination filter and phase equalizer 37 is coupled. The filter portion of unit 37 is arranged to pass without attenuation video frequency components that are outside the limits of the band of frequencies extending from 31.5 kilocycles to 464 kilocycles. This characteristic is illustrated by curve 52 of Fig. 2B. The phase equalizer portion delays in time the signals passing therethrough by an amount corresponding to the delay of signals passing through stages 33, 34 and 36. One terminal of the input circuit of unit 37 is grounded and its other is connected to switch terminal 24.

Filters 33 and 37 constitute means for deriving from source 19 one signal including frequency components in a selected portion of the video frequency band, namely, those passed by filter 33 and another signal including frequency components of the remainder of the band, namely, those passed by filter 37. Since, as a practical matter, these filters do not have cut-off characteristics of infinite slope, these bands overlap as indicated by cross-overs 53 in Fig. 2B. Modulator 34 may be defined as one element of a frequency-changer coupled to the signal deriving means 33, 37 and which includes a source of heterodyning signal 35 for shifting, more specifically inverting, the frequency components of the signal selected by filter 33. Line-scanning generator 31 was stated as having a repetition frequency of 15,750 cycles and the oscillator frequency of 496.125 kilocycles is an odd multiple of one-half that frequency.

In order to maintain such a frequency relationship, oscillator 35 is coupled to a frequency divider 38, which produces a signal having a frequency one-ninth that of the applied signal frequency, and, in turn, coupled to another frequency divider 39 which produces a signal one-seventh the frequency of the applied signal frequency. Divider 39 is coupled with a multiplier 40, which effectively doubles the frequency of the applied signal, and is connected to one input circuit of a phase detector 41 having another input circuit coupled to those output terminals of synchronizing-signal generator 28 at which the line-synchronizing signal is available. The output circuit of phase detector 41 is connected to a reactance tube 42 coupled with oscillator 35 in a known manner to control its operating frequency.

The operation of frequency-control chain 38—42 is generally well known and need not be described in detail. Briefly, the signal frequency of oscillator 35 is divided by 63 and multiplied by 2 to derive a signal corresponding in frequency with that of the line-repetition frequency. The derived signal and a signal to which the line-repetition frequency is synchronized are compared in phase in detector 41 to develop a control potential representing variations in phase and/or frequency therebetween. That control potential is applied to reactance tube 42 for controlling the oscillator frequency in known manner.

Arm 22 and contact 24 of switch 21 may be considered as a coding device for selectively interrupting and completing a signal path to stage 26 for a signal which includes the frequency components of a portion of the video frequency band, as shifted in frequency, and the frequency components of the remainder of the band. Whenever that path is completed, an altered mode of operation is established as compared with the afore-defined normal mode. A timing arrangement is provided to actuate movable switch arm 22 during spaced operating intervals, in accordance with a coding schedule. It is preferable that a random coding schedule be established to assure optimum privacy for this system. To that end, four-to-one frequency divider 43 is coupled to the field-synchronizing output terminals of generator 28 to generate one pulse for every four successive pulses therefrom so that at least four fields occur before a mode change is produced. The output circuit of divider 43 is coupled to a random frequency divider 44 to divide the signal from stage 43 in a random manner. Such a frequency divider is described and claimed in the copending application of Erwin M. Roschke, Serial No. 32,457, filed June 11, 1948, now Patent No. 2,588,413, issued March 11, 1952, and assigned to the same assignee as the present invention. The output circuit of the random frequency divider is coupled to the input or control circuit of a delay multivibrator 45, that is, a multivibrator or trigger circuit in which one applied pulse conditions the unit in one sense whereas the next succeeding pulse conditions the unit in the opposite sense, thereby to produce at the output terminals a signal of rectangular wave form in which the amplitude changes between maximum and minimum levels occur in accordance with controlling pulses supplied by frequency divider 44. Moreover, means (not shown) such as a delay line within unit 45 introduces a predetermined and fixed time delay between the application of an input pulse and the conditioning of stage 45, which delay preferably is one-half the framing rate. The output signal of the multivibrator is applied to the input terminals of a key-signal generator 46 which produces a key signal having characteristic variations representing the changes of condition in stage 45 and defining a coding schedule.

It is convenient to use amplitude variations of the key signal to represent the coding schedule and they may be obtained by controlling the on and off conditions of the generator. That control is established by the signal obtained from multivibrator 45 and supplied to the input circuit of key-signal generator 46. The signal thus applied to the generator is centered about its alternating-current axis and exhibits portions of positive and negative polarity. One of these portions turns the key-signal generator on, while the other turns the generator off.

The output circuit of generator 46 is coupled to one input circuit of a key-signal detector and gate device 47. The other input circuit of stage 47 is coupled with the source of field-synchronizing signals comprised of synchronizing-signal generator 28. Stage 47 is conditioned or gated for operation by a key signal variation so that the field-synchronizing pulse, which follows in time, alters a characteristic of an output signal. Specifically, stage 47 may include a multivibrator, similar to stage 45, but without the delay feature to produce a control signal centered about its alternating-current axis and exhibiting portions of positive and negative polarity. In other words, in the presence of a signal from generator 46, the next field pulse produces a change in the polarity of the control signal derived in stage 47. The field pulse which follows the termination of the key signal restores unit 47 to its first condition. The output circuit of stage 47 is coupled to a switch operator 48 in turn coupled to switch 21. Switch operator 48, for example, may be an electro-mechanical relay incorporating contacts 22—24, and thus the control signal from stage 47 effects displacement of switch arm 22 as between contacts 23 and 24 in accordance with the coding schedule developed by random divider 44. Units 47 and 48 may, for example, be similar in construction to like elements disclosed in Patent No. 2,547,598 of Erwin M. Roschke.

To permit a subscriber to utilize the coded television transmission, a line circuit 49 extends from the transmitting system and may be connected through any suitable distribution system, such as a telephone line, to subscriber receivers. Line circuit 49 is coupled to the output circuit of key-signal generator 46 so that where the line is a component of a telephone system, the key signal generator may be an oscillator that is super audible yet of a frequency sufficiently low for transmission over the line circuit.

Figure 2:
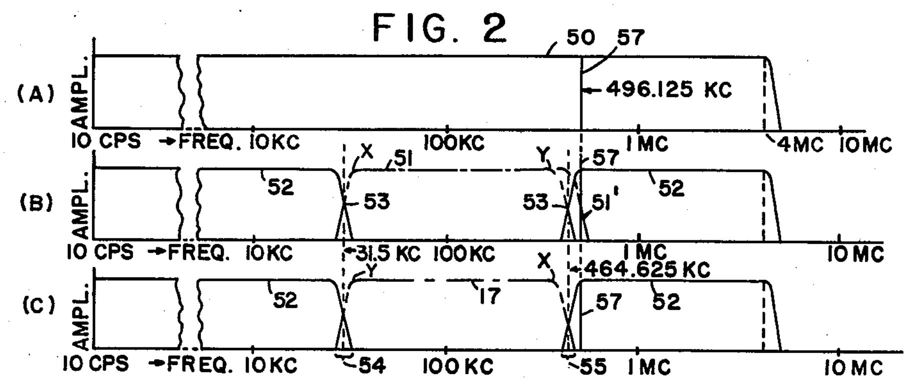
Figure 3:
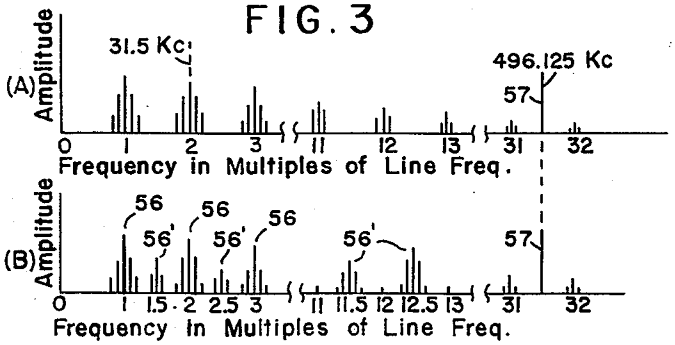
Fig. 3 is a graphical representation employed to explain the operation of the transmitter illustrated in Fig. 1.

To facilitate an understanding of the coding accomplished in the transmitting system, reference is made to the curves of Fig. 2 and graphs of Fig. 3. In the operating interval in which switch arm 22 is in engagement with contact 23, the transmitter operates in its normal mode in a substantially conventional manner with the entire video-frequency band represented by curve 50 of Fig. 2A transmitted in unaltered form. In addition to that signal, there is transmitted a reference or heterodyning carrier of 496.125 kilocycles, graphically represented by vertical line 57, since oscillator 35 is coupled with mixer 25 through modulator 34 and filter 36. As explained hereinbefore, although the frequency band of curve 50 is shown as continuous, actually the video components are clustered at multiples of the line frequency as represented in Fig. 3A with the heterodyning carrier 57 disposed between the 31st and 32nd multiple.

In operating intervals in which switch arm 22 is displaced into circuit engagement with contact 24, video signals from amplifier 20 are applied to mixer 25 via two paths. One of these paths includes band-pass filter 33 in which a band of video frequencies, extending from 31.5 kilocycles to 464 kilocycles, indicated by the dash-dot curve 51 of Fig. 2B, is selected and passed with substantially no attenuation to modulator 34. In the modulator the frequency components of that signal are heterodyned with the heterodyning carrier at 496.125 kilocycles to produce sum and difference frequency components in known fashion. Band-pass filter 36 selects the difference frequency components of the modulation products, as well as the heterodyning carrier, for application to mixer 25. By selecting the difference frequency components, the band of frequencies designated 17 in Fig. 2C is derived. Band 17 represents the frequency components of band 51 of Fig. 2B in reversed frequency position, the letters X and Y in Figs. 2B and 2C, which define the extremities of the bands, illustrating such reversal.

The other signal path includes stage 37 in which a band of frequencies substantially like that passed by filter 33 is eliminated, so that frequency components extending through the remainder of the video frequency band, represented by curve 52 in Figs. 2B and 2C, are applied to mixer 25. These frequency components are combined with those from filter 36 in mixer 25 and are applied to the transmitter and radiating means 26.

In this altered mode of operation, frequency components within band 17 are clustered in the video frequency spectrum at frequencies intermediate multiples of the line frequency. Consequently, although band 17 overlaps sections of band 52, in an absolute sense, at regions 54 and 55 in Fig. 2C, the components of these bands are in interleaving relation as demonstrated in Fig. 3B, wherein the frequency components of band 52 are designated by the numeral 56 and those of band 17 designated 56′. This characteristic of operation enables a receiver to interpret frequency regions 54 and 55, as will be more apparent from the discussion to follow.

Figure 4:
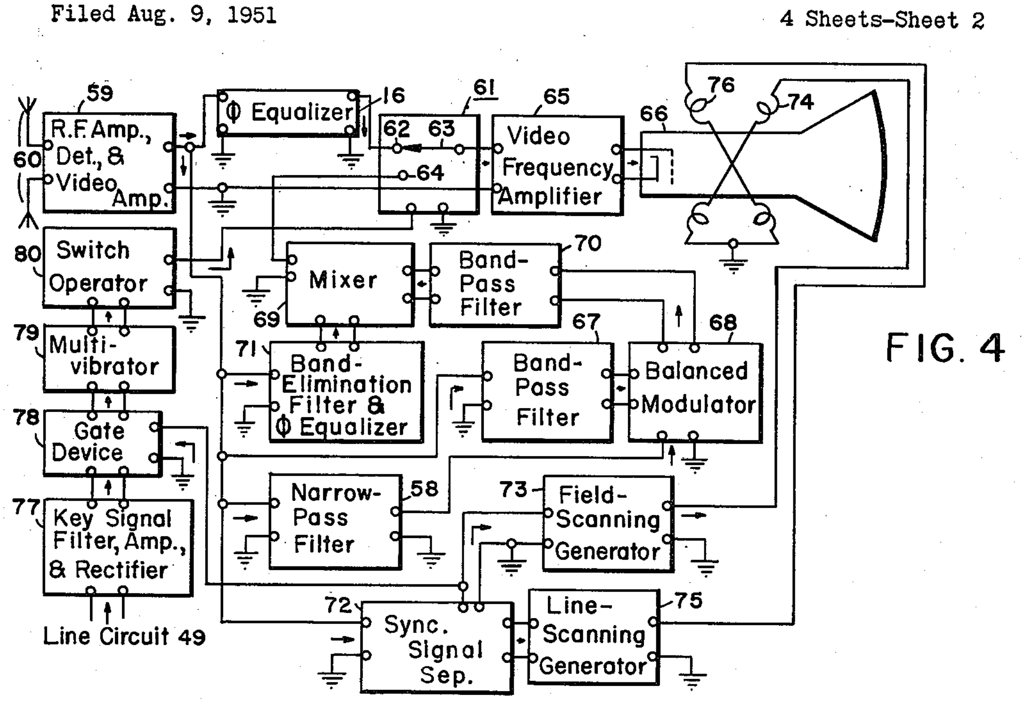
Fig. 4 shows in block diagram a receiver constructed to utilize the subscription television signal transmitted by the transmitter of Fig. 1.

Fig. 4 illustrates a subscriber receiver constructed to utilize the signals developed by the transmitter of Fig. 1. The receiver includes a radio-frequency amplifier, detector and video amplifier stage 59 having input terminals connected to an appropriate antenna circuit 60 and output terminals, one of which is grounded while the other is connected to a fixed contact 62 of a single pole double throw switch 61 having a movable arm 63 and another fixed contact 64. The receiver also includes a video-frequency amplifier 65 having one of its input terminals grounded and the other connected to switch arm 63 through a phase-equalizing network 16. The output circuit of the amplifier is connected to the input electrodes of an image-reproducing device 66 such as a conventional cathode-ray tube.

The output circuit of stage 59 is also connected to a band-pass filter 67, having an attenuation-frequency characteristic like that of stage 33 of Fig. 1, which is coupled to one input circuit of a balanced amplitude modulator 68. Another input circuit of modulator 68 is coupled to the output circuit of a narrow-pass filter 58, the input circuit of which is coupled to stage 59. Filter 58 passes with substantially no attenuation a narrow band of frequencies including the signal frequency developed by heterodyning oscillator 35 of Fig. 1, at 464.625 kilocycles. Modulator 68 is coupled to a mixer 69 through a band-pass filter 70, which is identical with filter 67, and one terminal of the output circuit of the mixer is grounded and the other is connected to switch contact 64. A band-elimination filter and phase equalizer 71, like stage 37 of Fig. 1, is coupled between unit 59 and mixer 69. Stage 59 is also coupled to a synchronizing-signal separator 72 having one output circuit coupled to a field-scanning generator 73 in turn connected to field-deflection elements 74 associated with reproducing device 66. Another output circuit of separator 72 is coupled to a line-scanning generator 75 in turn coupled to line deflection elements 76 of image tube 66.

Line circuit 49, extending to the transmitter of Fig. 1, is connected to a key-signal filter amplifier and rectifier 77, the output circuit of which is coupled to a gate device 78. Another input circuit of gate device 78 is coupled to the output circuit of separator 72 wherein field-synchronizing signals are available. Gate device 78 is of the type that is operatively conditioned by a signal from stage 77 so that the next succeeding field pulse from separator 72 produces a pulse in the output circuit of device 78. That output circuit is coupled to a multivibrator 79 which is coupled to switch 61 through a switch operator 80. Elements 77—80 and 61 may be similar in construction to stages 47, 48 and 21, respectively, of Fig. 1.

The receiving system of Fig. 4 may be tuned to receive a signal transmitted by the transmitter of Fig. 1. This signal is intercepted by antenna 60, amplified and detected in stage 59 and applied through switch 61 and phase equalizer 16 to video amplifier 65 for amplification before application to image-reproducing device 66 for controlling the intensity of the cathode-ray beam developed therein in well known manner.

The synchronizing components of the received television signal are separated therefrom in stage 72, the field-synchronizing components being utilized to synchronize generator 73, and hence the field deflection of device 66, with the incoming television signal. The line-synchronizing components are applied to generator 75 so that the timing of that generator, and the line deflection of the reproducing device, are synchronized with the incoming television signal.

The operation of the receiver as just described, with the movable arm 63 of switch 61 in the illustrated position, corresponds to the normal mode of transmitter operation and is generally similar to that of any conventional television receiver with the exception that the heterodyning signal supplied by source 35 of the transmitter is applied to image-reproducing device 66. As defined earlier, the frequency components of the video signal are disposed in clusters spaced by multiples of the line-repetition frequency, as represented in Fig. 3A. The heterodyning carrier designated 57 appears between the clusters at the 31st and 32nd harmonic of the line frequency in the detected video signal. That signal component has little or no effect upon the picture displayed on the viewing screen of device 66 since, by virtue of its frequency relationship to the line frequency, the intensity variations produced thereby on the viewing screen are integrated out. That is, the frequency of the heterodyning carrier 57 is so related to the line-scanning frequency that during successive scansions of each image line the added information appears with opposite phase, thereby effectively cancelling out such information as far as the human eye is concerned.

Let it be assumed that, under the control of random device 44, a key signal is generated by stage 46 of the transmitter indicating that with the occurrence of the following field-synchronizing pulse, a mode change will take place. The time between transmission of the key signal and the mode change allows for various time delays of the key signal over line 49 to different subscriber locations. Upon reception of the key signal in stage 77 a potential is developed in the output circuit thereof to open gate device 78 so that the succeeding field pulse conditions multivibrator 79 to actuate switch operator 80 and displace arm 63 from engagement with contact 62 into circuit engagement with contact 64. Filter 67 selects a band of frequencies from stage 59, as represented by curve 17 of Fig. 2C, and supplies the frequency components thereof to modulator 68. Also applied to the modulator is the heterodyning carrier signal selected by filter 58, so that in the output circuit of the modulator appear the usual sum and difference frequency components of the applied signals. The band of frequencies defined by curve 17 is shifted in frequency, or reversed, into the initial-frequency position shown by curve 51 of Fig. 2B and is applied, together with the frequency componets from elimination filter 71, to the mixer 69 for combination. The combined signal is applied from the output circuit of mixer 69 through switch contact 64 and movable arm 63 to stage 65 for amplification before application to image-reproducing device 66.

As pointed out hereinbefore, an electrical filter is incapable of interpreting areas of confusion 54 and 55 of Fig. 2C. Consequently, band-pass filter 67 selects frequency components from the video frequency spectrum which include sections of frequency band 52. It will now be shown that those sections are psychologically filtered while the entire range of frequencies within band 17, representative of the initial band 51, is reproduced.

In heterodyning at the receiver the frequency components within band 53 with a signal frequency of 496.125 kilocycles, or an odd harmonic of one-half the line frequency, all of the desired frequency component clusters are shifted from their altered frequency positions to initial positions at multiples of the line frequency, it being remembered that the original shift was obtained by heterodyning with the same signal frequency. Those frequency components within band 53 that are a part of unaltered band 52 are now shifted to frequency-positions intermediate frequencies representing multiples of the line frequency. Consequently, these unwanted components modulate the beam within reproducing device 66 with opposite polarity during first and third fields and likewise during second and fourth fields. Hence, they are psychologically filtered out, since at least four fields and multiples of four fields occur before a mode change is instituted. The receiver then is operative to reproduce an intelligible image at the viewing screen of reproducing device 66 during this altered mode of operation.

When, under the control of random device 44, the key signal is cut off to indicate a change back to the initial mode of operation, switches 21 and 61 of the transmitter and receiver are displaced back to the positions illustrated in Figs. 1 and 4 upon the occurrence of the following field-synchronizing pulse. The system operates in the initial or normal mode until random device 44 indicates a mode change.

Considering now the operation of an unauthorized receiver, it may be generally stated that during the initial mode of operation, described hereinbefore, an intelligible picture may be derived. However, during the altered mode of operation, the frequency components within band 17 of Fig. 2C, being related to an odd multiple of one-half the line frequency, are psychologically integrated out. Therefore, a sizable portion of the video frequency band is effectively eliminated to destroy the intelligence of the received picture.

The system as described has been provided with means for producing a mode change after four or a multiple of four complete fields have occurred, namely divider 43 of Fig. 1. It is to be understood that the invention is not limited to such timing. The sole requirement is that the same field in each of two successive frames be transmitted in the altered mode so as to permit psychological integration of undesired information at an authorized receiver. Mode changes may be timed accordingly by suitable apparatus incorporated in the transmitter of Fig. 1.

A subscription television system in accordance with the invention transmits information useful only to authorized receivers. Coding is accomplished by shifting in frequency a portion of the video frequency band and areas of confusion which might result from the overlapping of different sections of the coded signal are obviated by operating on, or heterodyning, the band section to be shifted with a carrier having a frequency equal to an odd multiple of one-half the line frequency.

Although a particular portion of the video frequency band has been selected in the foregoing illustrative example of the invention, it is apparent that the extent of the band and its position within the video frequency spectrum may be modified without departing from the scope of the invention. Moreover, while the heterodyning signal from oscillator 35 has been included in the radiation from the transmitter, it may be omitted and may be supplied or generated at the receiver.

The equalizers 18 and 16 provided in the transmitter and receiver cause the signals translated thereby to experience the same phase delay for all modes of operation.

Figure 5:
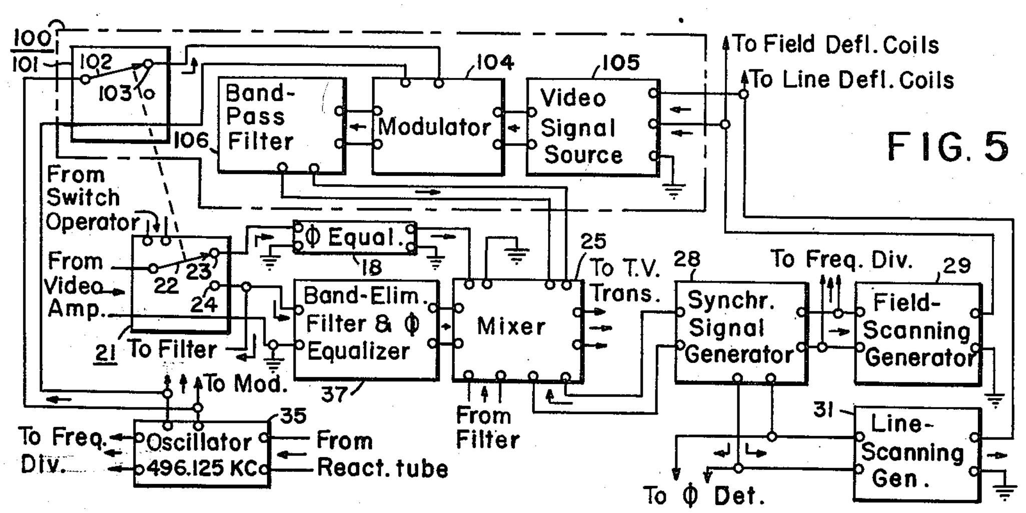
Fig. 5 represents a modification of the transmitter of Fig. 1.

It has been determined that the video-frequency components of a television signal coded in the foregoing manner may be analyzed spectrally at an unauthorized receiver to indicate mode changes. This is apparent from an inspection of Fig. 3, which represents the different operating modes. Consequently, an unauthorized receiver might be able to decode these subscription transmissions. In order to preclude such procedure, the modified arrangement of Fig. 5 may be incorporated in the transmitter of Fig. 1 effectively to include in the radiated signal video information in addition to the image being translated. In Fig. 5 those elements which have a counterpart in Fig. 1 are identified by the same reference numerals, and, for convenience, only a portion of the complete transmitter has been represented. In addition to the transmitter units of Fig. 1, the system of Fig. 5 includes a device 100 comprising a single-pole single-throw switch 101 having a movable arm 102 and a fixed contact 103. Arm 102 is ganged with arm 22 of switch 21, and when switch 21 is conditioned for the initial or unaltered mode of operation, arm 102 completes a circuit connection with contact 103 to couple oscillator 35 with one input circuit of a conventional modulator 104.

A video signal source 105, representing information unrelated to the image being televized, having its line and field-scanning functions under the control of scanning generators 31 and 29 and producing video-signal components unrelated to those of generator 19, includes an output circuit coupled to another input circuit of modulator 104. The output circuit of modulator 104 is coupled to mixer 25 through a band-pass filter 106 having a band-pass characteristic like that of filter 36, as represented by curve 51 of Fig. 2B.

Figure 6:
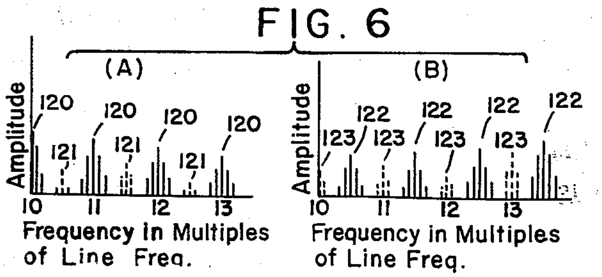
Fig. 6 is a graphical representation helpful in explaining the operation of the circuit of Fig. 5.

In the normal mode of operation the video-frequency components occur in clusters spaced by multiples of the line-scanning frequency, as indicated by the groups 120 of Fig. 6A. With the arrangement of Fig. 5, frequency components from auxiliary source 105 are shifted in frequency as a result of being heterodyned with the signal from oscillator 35 and the resulting components in the output circuit of modulator 104 are disposed in the frequency spectrum intermediate multiples of the line frequency. Filter 106 selects the frequency components within the confines of band 51 of Fig. 2B and applies them to mixer 25, wherein they are combined with the composite video signal prior to transmission. Thus, video components indicated by the clusters 121 in Fig. 6A are interspersed with the desired intelligence components during the initial mode of transmission.

In the altered mode of operation, in which switch arm 22 is in circuit engagement with contact 24, switch arm 102 is removed from contact 103 and hence the frequency components from auxiliary source 105 pass without alteration in frequency through modulator 104. Those components within band 51 are selected by filter 106 for application to mixer 25. Since, in the altered mode of operation, frequency components of the coded signal are shifted in frequency to positions intermediate multiples of the line frequency, the filtered components from auxiliary source 105 appear at multiples of the line frequency and so are interposed between components of the coded signal. This condition of operation is represented in Fig. 6B, the coded information being represented by clusters 122 and the jamming signal components being represented by clusters 123.

Consequently, a spectral analysis of the video-frequency band will show similar frequency distribution in each of the two modes of transmission to preclude unauthorized reproduction of the desired video information. Since the frequency components from source 105 are related to an odd multiple of one-half the line frequency during the initial transmitting mode, they are effectively filtered out at any receiver. However, they are related to multiples of the line frequency during the altered transmitting mode and, consequently, are integrated out only at an authorized receiver in the manner explained. During this altered mode of operation, the components from source 105 are reproduced on unauthorized receivers and for that reason they may advantageously supply information to such receivers as to the nature of the telecast.

Figure 7:
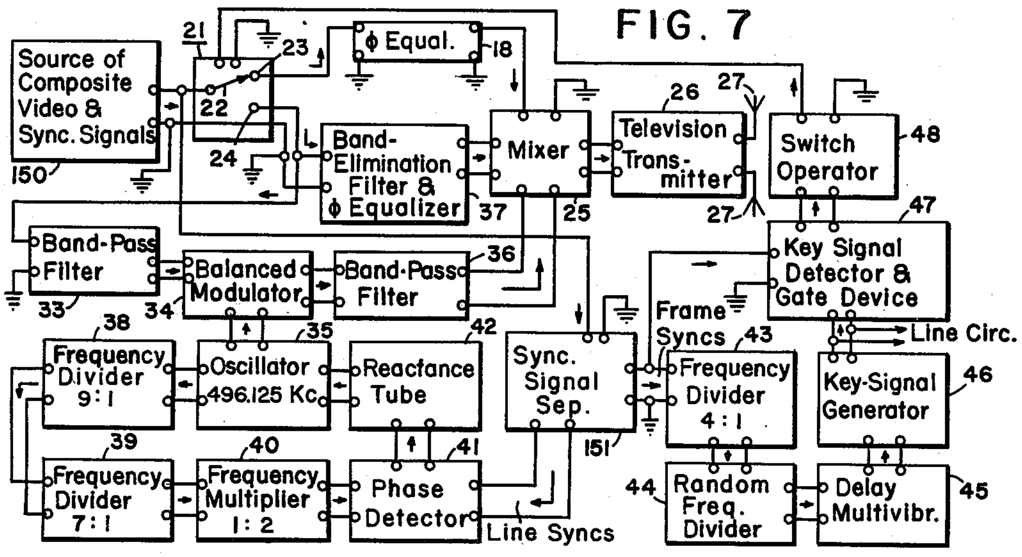
Fig. 7 is a block diagram of a subscription type television transmitter featuring another embodiment of the present invention.

The transmitter of Fig. 7 represents another embodiment of the invention in which the signal to be encoded includes both video and synchronizing-signal components. Elements which are common to both the transmitter of Figs. 1 and 7 are identified by the same reference numerals. The modified transmitter includes a source 150 of composite video and synchronizing signals, for example, a coaxial cable fed with these signal components from a remote originating location, coupled to switch 21. The output circuit of source 150 is also coupled to the input circuit of a synchronizing-signal separator 151 which has one output circuit supplying field-synchronizing pulses to divider 43 and another output circuit supplying line-synchronizing pulses to phase detector 41. Separator 151 performs in the manner of generator 28 of Fig. 1 insofar as stages 43 and 41 are concerned.

In the normal mode of operation, represented by the illustrated position for switch 21, an unaltered composite television signal comprising both synchronizing and video components is transmitted. However, in the altered mode of operation wherein switch arm 22 is displaced from engagement with contact 23 into circuit engagement with contact 24, the composite video and synchronizing signal is supplied to band-pass filter 33 and to band elimination filter 37. Video signal components are shifted in frequency in the same manner as in the transmitter of Fig. 1. In addition, certain of the frequency components, which comprise the synchronizing signal and fall within the pass band of filter 33, are altered or shifted in frequency with respect to the remainder. Consequently, in this second mode of transmission, not only is the video signal coded, but the synchronizing signal components are altered in form. In effect, as far as the circuits of an unauthorized receiver are concerned, the shape of the synchronizing signal pulses are modified so that such a receiver would tend to lose synchronization during the altered mode of transmission.

Figure 8:
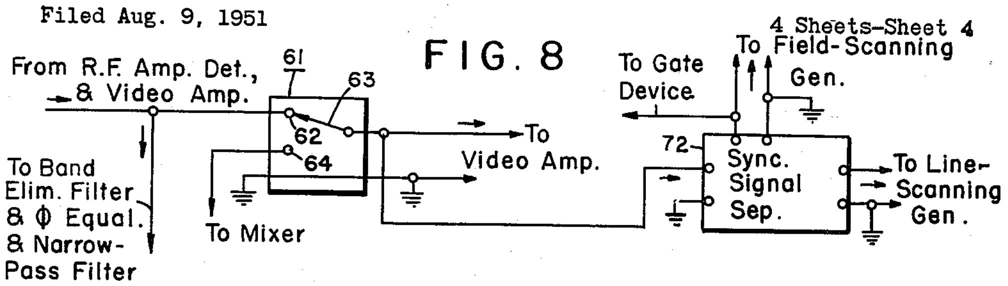
Fig. 8 shows a modified arrangement for the receiver circuit of Fig. 3 which may be employed in connection with the transmitter of Fig. 7.

In order for an authorized receiver properly to decode that signal, the modified circuit arrangement of Fig. 8 may be employed. Fig. 8 represents a portion of the receiver circuit of Fig. 4 and differs therefrom in that the input circuit of synchronizing-signal separator 72 is coupled to the output side of switch 61 rather than to the output circuit of stage 59. Hence, during altered transmitting modes, the received composite signal, including video and synchronizing components, is reconstituted, and synchronizing signal pulses of unaltered waveform are applied to separator 72.

In Fig. 9 there is represented a transmitting system which provides three different modes of transmission, namely, an initial mode, a second mode in which a portion of the video signal components are shifted in the manner described in connection with Fig. 1, and a third mode in which two subbands, that are substantially equal, non-adjacent fractional portions of the video band, are shifted from initial frequency-positions into interchanged relationship and into interleaving relation with the frequency components of the remainder of the band. To that end a portion of the circuit of Fig. 1 is employed and like elements are identified by the same reference numerals in Fig. 9.

The transmitting system includes, coupled to the output circuit of video-frequency amplifier 20, a switch 200 of the single-pole, triple-throw variety including a movable arm 201 and fixed contacts 202, 203 and 204. The circuit elements coupled to contacts 202 and 203 are arranged as in Fig. 1 and consequently will not be described in detail.

Instead of the oscillator and frequency-control chain employed in Fig. 1, another arrangement is provided. The alternative circuit includes a two-to-one frequency divider 205 coupled to the output circuit of synchronizing-signal generator 28 at which line pulses are available. The output of that divider is coupled to a frequency multiplier 206 which produces an output signal sixty-three times the frequency of that applied. The output circuit of multiplier 206 is coupled to modulator 34 and to mixer 25 so that the function of oscillator 35 of Fig. 1 is fully performed.

Switch terminal 204 is coupled to one terminal of a double-band-pass filter and phase equalizer 207, the other terminal of which is grounded. The output circuit of stage 207 is coupled to an input circuit of mixer 25. The double band-pass characteristic of stage 207 is illustrated by curves 150 and 151 in Fig. 10, the two pass bands extending from 10 cycles per second to 30 kilocycles and from 1.2 megacycles to 2.8335 megacycles, respectively. Switch terminal 204 is also connected to one input terminal of a band-pass filter 208, the other terminal of which is grounded. Filter 208 has a band-pass characteristic extending from 30 kilocycles to 1.2 megacycles, as illustrated by curve 152 in Fig. 10A, and its input circuit is in parallel with another band-pass filter 209 having a pass characteristic extending from 2.8335 megacycles to 4.0035 megacycles, as represented by the curve 153 in Fig. 10A. Filters 208 and 209 are coupled with respective modulators 210 and 211, to the input circuit of each of which is applied a signal from a frequency multiplier 212. Multiplier 212 derives its input signal from divider 205 and produces a signal having a frequency 356 times that of the applied signal. The resulting signal has a frequency of 2.8035 megacycles, represented by vertical line 154 in Fig. 10A. The output circuits of modulators 210 and 211 are coupled through associated band-pass filters 213 and 214. Filter 213 has a pass characteristic like that of filter 209 but modified to include the heterodyne carrier, as indicated by extension 155 of curve 153, and filter 214 has a pass characteristic like that of filter 208.

Since switch 200 has three operating positions, a switch operator 215 is provided therefor which functions to position arm 201 into circuit engagement with any one of the contacts 202–204 in accordance with a coding schedule. A coding system 216 is coupled to switch operator 215 and produces suitable control signals for actuating the operator in accordance with the three mode conditions. A pair of line circuits 217 and 218 extend from coding system 216 for conveying key-signal information from the coding system to designate the operating intervals in which one of the three modes is being employed. A four-to-one frequency divider 21 couples the field output circuit of synchronizing-signal generator 28 to the coding system. Another input circuit of the coding system is coupled to the same output circuit of the generator. Coding system 216 may be of the type described in the copending application of Alexander Ellett, Serial No. 209,185, filed February 2, 1951, and issued November 13, 1956 as Patent 2,770,671, and assigned to the same assignee as the present invention. The system there disclosed employs a first key signal transmitted via one line circuit to indicate a change from an initial to an altered mode and a second key signal transmitted via another line circuit to indicate which of the two altered modes are to take place. Specifically, the presence of a key signal on line circuit 217 indicates a mode change will take place with the occurrence of the following field pulse wherein arm 201 is displaced from engagement with contact 202. The presence of a key signal on line 218 defines contact 203 as the one at which the arm will come to rest and the absence of a signal on line 218 means that contact 204 will be engaged by the switch arm.

Since the initial and second modes are like those of the transmitter of Fig. 1, a description thereof is deemed unnecessary. In the third mode, wherein switch arm 201 completes a circuit to contact 204, the output circuit of video-frequency amplifier 20 is coupled to the input circuits of stage 207, filter 208 and filter 209. From the frequency components of the video band, stage 207 supplies to mixer 25 those components within the bands defined by curves 150 and 151. At the same time, filter 208 selects and applies to modulator 210 the components within band 152 while filter 209 applies the components within band 153 to modulator 211. The components within band 152 are heterodyned with the signal from multiplier 212 in modulator 210, and filter 213 selects the resulting intermodulation products of the sum frequencies and the heterodyning carrier from source 212 for application to mixer 25. The frequency components from filter 209 likewise are heterodyned with the signal from stage 212 in modulator 211, and filter 214 selects the difference frequency intermodulation products for application to mixer 25. It is apparent from the afore-defined frequency relationships that frequency components within the bands designated 152 and 153 are interchanged in the video frequency spectrum as represented in Fig. 10B by the identifying numerals 152' and 153'. Moreover, as illustrated by the letters W, X, Y and Z in Fig. 10, the frequency components of bands 152 and 153 remain in their original frequency order. As in the case for the second mode of operation, the heterodyning carrier of 2.8035 megacycles is an odd multiple of one-half the line frequency so that the frequency components of bands 152 and 153 are shifted into interleaving relation with those of the remaining portions 150 and 151 of the video frequency spectrum.

In Fig. 11 there is shown a receiver for decoding the signal radiated by the transmitting system of Fig. 9. Portions of the receiver are similar to the one shown in Fig. 4 and like elements are identified by the same reference numerals. In order to accommodate the three modes of operation, the receiver includes a switch device 250 of the single-pole, triple-throw type. The switch includes a movable arm 251 and fixed contacts 252, 253 and 254. In the modes of operation in which either of contacts 252 and 253 are engaged by arm 251, the operation of the receiver is similar to that of Fig. 4.

In order to decode the transmitted signal in the third mode of operation, the output circuit of stage 59 is coupled to the respective input circuits of a double band-pass filter and equalizer 255, band-pass filter 256, a narrow pass filter 257 and a band-pass filter 258. The filter portion of stage 255 has a band-pass characteristic like that of stage 207 and the filters 256 and 258 have band-pass characteristics like those of filters 208 and 209, respectively. Filter 257 is arranged to pass without attenuation a narrow band including a frequency of 2.8035 megacycles. The output circuit of stage 255 is coupled to one input circuit of a mixer 259 which includes a pair of output terminals, one of which is grounded and the other connected to switch terminal 254. Filter 256 is coupled to an input circuit of a balanced modulator 260, in turn coupled to mixer 259 through a band-pass filter 261 having a band-pass characteristic like that of filter 258. The output circuit of narrow pass filter 257 is coupled to respective input circuits modulators 260 and 262. Modulator 262 has another input circuit coupled to filter 258 and its output circuit is coupled with mixer 259 through a band-pass filter 263 having a band-pass characteristic like that of filter 256.

In order to actuate switch arm 251 into any one of its several operative positions, the receiver includes a switch operator 264, which may be similar to operator 215 of Fig. 9, having an output circuit coupled with switch 250 and an input circuit coupled to a decoding system 265. Field-synchronizing pulses are applied to decoding system 265 from separator 72 and key information is applied thereto via line circuits 217 and 218. It may be generally stated that decoding system 265 is the counterpart of coding system 216 and the details thereof may be obtained in the afore-mentioned copending application of Alexander Ellett.

Let it be assumed that the presence of a key signal on line 218, with no key signal on line 217, indicates a shift to the second mode of operation. With the following field-synchronizing pulse the switch arms 201 and 251 of the transmitter and receiver of Figs. 9 and 11 are displaced essentially simultaneously into engagement with contacts 203 and 253. The system is conditioned for operation like the second or altered mode of the system in Figs. 1 and 4 and the descriptive material presented in connection therewith is generally applicable to this operation.

Now let it be assumed that a key signal is transmitted on each of lines 217 and 218 to indicate a change to the third mode. The following field-synchronizing pulse causes switch arm 201 to be displaced into circuit engagement with contact 204 and likewise arm 251 is carried into circuit engagement with contact 254. The received signal is translated from stage 59 to mixer 259 through stage 255 and hence only frequency components within the bands 150 and 151 are applied to the mixer via that path. The frequency components of the video signal are also applied to filter 256, which selects the frequency components within band 153' of Fig. 10B and applies these components to modulator 260 wherein they are intermodulated with the heterodyning signal at 2.8035 megacycles from filter 257. Band-pass filter 261 selects the resulting sum frequency components for application to mixer 259. Likewise, filter 258 selects the components within band 152' which are heterodyned in modulator 262 with the signal from filter 257; the difference frequency components are selected by filter 263 for application to mixer 259. Thus, the video spectrum is reconstituted, the originally shifted or interchanged subbands of frequency components being reverted to their original or initial frequency-positions.

The subscription television system of Figs. 9–11, since it provides more than two modes of operation, affords a greater degree of security than would be obtained with a lesser number. In addition, all the advantages of interleaving the frequency components of one portion of the video spectrum with those of another are incorporated in each of the second and third modes of operation in a manner similar to that explained in connection with the system of Figs. 1 and 4.

Although the specific examples of systems embodying the invention described herein produce interleaving of some of a group of frequency components with those in another portion of a band of frequencies, a greater amount of band overlap may be provided. For instance, with reference to Fig. 2A, the components of band 51 may be shifted so that they are entirely within the limits of bands 52 during the altered mode of transmission. Of course, the filter circuits of the receiver and transmitter would be modified accordingly.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A subscription type television system comprising: a source of video signals having frequency components extending over a predetermined frequency band and occurring during trace intervals having a given repetition frequency; means for deriving from said source one signal including frequency components in a selected fractional portion of said band and another signal including frequency components in the remainder of said band; a frequency changer coupled to said signal-deriving means and including a source of heterodyning signal having a frequency substantially equal to an odd multiple of one-half said repetition frequency for shifting the frequency components of one of said signals into interleaving relation with those of the other of said signals; a mixer coupled to said signal-deriving means and to said frequency changer for combining said one signal, as shifted in frequency, with said other signal to produce a third signal; means for radiating a subscription program signal; a coding device for completing a signal path for said third signal to said radiating means; a receiver for intercepting said subscription program signal; and means in said receiver, responsive to said subscription program signal, for deriving said first-named video signal for reproduction.

2. A subscription type television transmitter comprising: a source of video signals having frequency components extending over a predetermined frequency band and occurring during trace intervals having a given repetition frequency; means for deriving from said source one signal including frequency components in a selected fractional portion of said band and another signal including frequency components in the remainder of said band; a frequency changer coupled to said signal-deriving means and including a source of heterodyning signal having a frequency substantially equal to an odd multiple of one-half said repetition frequency for shifting the frequency components of one of said signals into interleaving relation with those of the other of said signals; a mixer coupled to said signal-deriving means and to said frequency changer for combining said one signal, as shifted in frequency, with said other signal to produce a third signal; means for radiating a subscription program signal; and a coding device for selectively completing a signal path for said third signal to said radiating means.

3. A subscription type television transmitter comprising: a source of video signal having frequency components extending over a predetermined frequency band and occurring during trace intervals having a given repetition frequency; means for deriving from said source one signal including frequency components in a selected portion of said band and another signal including frequency components in the remainder of said band; a frequency changer coupled to said signal-deriving means and including a source of heterodyning signal having a frequency substantially equal to an odd multiple of one-half said repetition frequency for inverting the frequency-order of the components of said one signal within said intermediate portion of said band; a mixer coupled to said signal-deriving means and to said frequency changer for combining said one signal, as inverted in frequency, with said other signal to produce a third signal; means for radiating a subscription program signal; and a coding device for selectively completing a signal path for said third signal to said radiating means.

4. A subscription type television transmitter comprising: a source of video signal having frequency components extending over a predetermined frequency band and occurring during trace intervals having a given repetition frequency; means for deriving from said source one signal including frequency components in selected first and second, substantially equal but nonadjacent fractional portions of said frequency band and another signal including frequency components in the remainder of said band; a frequency changer coupled to said signal-deriving means and including a source of heterodyning signal having a frequency substantially equal to an odd multiple of one-half said repetition frequency for shifting the frequency components of said first and second portions of said one signal into interchanged relationship and into interleaving relation with those of said other signal; a mixer coupled to said signal-deriving means and to said frequency changer for combining said one signal, as shifted in frequency, with said other signal to produce a third signal; means for radiating a subscription program signal; and a coding device for selectively completing a signal path for said third signal to said radiating means.

5. A subscription type television system comprising: a source of video signals having frequency components extending over a predetermined frequency band and occurring during trace intervals having a given repetition frequency; means for deriving from said source one signal including frequency components in a selected fractional portion of said band and another signal including frequency components in the remainder of said band; a frequency changer coupled to said signal-deriving means and including a source of heterodyning signal having a frequency substantially equal to an odd multiple of one-half said repetition frequency for shifting the frequency components of one of said signals into interleaving relation with those of the other of said signals; a mixer coupled to said signal-deriving means and to said frequency changer for combining said one signal, as shifted in frequency, with said other signal to produce a third signal; means for radiating a subscription program signal; a coding device for selectively coupling said video signal source and said mixer to said radiating means in alternation in accordance with a coding schedule; a receiver for intercepting said subscription program signal; and a decoding mechanism included in said receiver and actuated in accordance with said coding schedule for decoding said program signal.

6. A subscription type television transmitter comprising: a source of video signals having frequency components extending over a predetermined frequency band and occurring during trace intervals having a given repetition frequency; means for deriving from said source one signal including frequency components in a selected fractional portion of said band and another signal including frequency components in the remainder of said band; a frequency changer coupled to said signal-deriving means and including a source of heterodyning signal having a frequency substantially equal to an odd multiple of one-half said repetition frequency for shifting the components of one of said signals into interleaving relation with those of the other of said signals; a mixer coupled to said signal-deriving means and to said frequency changer for combining said one signal, as shifted in frequency, with said other signal to produce a third signal; means for radiating a subscription program signal; and a coding device for selectively coupling said video signal source and said mixer to said radiating means in alternation in accordance with a coding schedule.

7. A subscription type television transmitter comprising: one source for supplying a first video signal having frequency components extending over a predetermined frequency band and occurring during trace intervals having a given repetition frequency; frequency changer coding means coupled to said source and including a source of heterodyning signal having a frequency substantially equal to an odd multiple of one-half said repetition frequency for deriving a second video signal related to said first video signal but shifted in the frequency spectrum; another source for supplying a third video signal unrelated to said first and second video signals but having frequency components included within said band and occurring during said trace intervals; a mixer coupled to said coding means and to said other source for combining said second and third video signals; and means coupled to said mixer for radiating a subscription program signal.

8. A subscription type television transmitter comprising: one source for supplying a first video signal having frequency components extending over a predetermined frequency band and occurring during trace intervals having a given repetition frequency; one frequency changer coupled to said source and including a source of heterodyning signal having a frequency substantially equal to an odd multiple of one-half said repeition frequency for deriving a second video signal related to said first video signal but shifted in the frequency spectrum; another source for supplying a third video signal unrelated to said first and second video signals but having frequency components included within said band and occurring during said trace intervals; another frequency changer for modulating an applied signal with a heterodyning signal having a frequency equal to an odd multiple of one-half said repetition frequency; a mixer amplifier; a coding mechanism having one operating condition in which said mixer amplifier is coupled to said one source and is coupled to said other source through said other frequency changer, and having a second operating condition in which said mixer is coupled to said one frequency changer and is effectively directly coupled to said other source; means for actuating said coding mechanism between said operating conditions thereof in accordance with a coding schedule; and means coupled to said mixer amplifier for radiating a subscription program signal.

9. A subscription type television transmitter comprising: one source for supplying a first video signal having frequency components extending over a predetermined frequency band and occurring during trace intervals having a given repetition frequency; one frequency changer coupled to said source and including a source of heterodyning signal having a frequency substantially equal to an odd multiple of one-half said repetition frequency for deriving a second video signal related to said first video signal but having a selected fractional portion of said frequency components shifted in the frequency spectrum; another source for supplying a third video signal unrelated to said first and second video signals but having frequency components included within said band and occurring during said trace intervals; another frequency changer for modulating an applied signal with a heterodyning signal having a frequency equal to an odd multiple of one-half said repetition frequency; a mixer amplifier; a coding mechanism having one operating condition in which said mixer amplifier is coupled to said one source and is coupled to said other source through said other frequency changer, and having a second operating condition in which said mixer is coupled to said one frequency changer and is effectively directly coupled to said other source; means for actuating said coding mechanism between said operating conditions thereof in accordance with a coding schedule and means coupled to said mixer amplifier for radiating a subscription program signal.

10. A subscription type television transmitter comprising: one source for supplying a video signal having frequency components extending over a predetermined frequency band and occurring during trace intervals having a given repetition frequency; means for deriving from said source one signal including frequency components in a selected fractional portion of said frequency band and another signal including frequency components in the remainder of said band; a frequency changer coupled to said signal-deriving means and including a source of heterodyning signal having a frequency within said band and substantially equal to an odd multiple of one-half said repetition frequency for shifting the frequency components of said one signal into interleaving relation with those of said other signal; a mixer coupled to said signal-deriving means and to said frequency changer for combining said one signal, as shifted in frequency, with said other signal to produce a third signal; means for radiating a subscription program signal; means for coupling said source of heterodyning signal with said radiating means; and a coding device for selectively coupling said video signal source and said mixer to said radiating means in alternation in accordance with a coding schedule.

11. A subscription type television receiver for utilizing a video signal having frequency components extending over a predetermined frequency band and occurring during trace intervals having a given repetition frequency and further having, during spaced operating intervals in accordance with a coding schedule, frequency components of a selected fractional portion of said band shifted from an initial frequency-position by an amount corresponding to an odd multiple of one-half said repetition frequency, said receiver comprising: a circuit for translating said video signal; means for deriving from said circuit one signal including frequency components in said fractional portion of said band and for deriving another signal including frequency components in the remainder of said band; a frequency changer coupled to said signal-deriving means and including a source of heterodyning signal having a frequency substantially equal to an odd multiple of one-half said repetition frequency for shifting the frequency components of said one signal into initial said frequency-position; a mixer coupled to said signal-deriving means and to said frequency-changer for combining said one signal, as shifted into said initial frequency-position, with said other signal to produce a third signal; an image-reproducing device coupled to said mixer; and decoding apparatus for completing a signal path for said third signal to said image-reproducing device during said spaced operating intervals.

12. A subscription type television receiver for utilizing a video signal having frequency components extending over a predetermined frequency band and occurring during trace intervals having a given repetition frequency and further having, during spaced operating intervals in accordance with a coding schedule, frequency components of a selected intermediate portion of said band shifted from an initial frequency-position into reversed frequency-order and by an amount corresponding to an odd multiple of one-half said repetition frequency said receiver comprising: a circuit for translating said video signal; means for deriving from said circuit one signal including frequency components in said fractional portion of said band and for deriving another signal including frequency components in the remainder of said band; a frequency changer coupled to said signal-deriving means and including a source of heterodyning signal having a frequency substantially equal to an odd multiple of one-half said repetition frequency for reversing the frequency-order of the frequency components of said one signal into said initial frequency-position; a mixer coupled to said signal-deriving means and to said frequency-changer for combining said one signal, as shifted into said initial frequency-position, with said other signal to produce a third signal; an image-reproducing device coupled to said mixer; and decoding apparatus for completing a signal path for said third signal to said image-reproducing device during said spaced operating intervals.

References Cited in the file of this patent

UNITED STATES PATENTS

| | | |
|---|---|---|
| 1,769,918 | Gray | July 8, 1930 |
| 2,408,692 | Shore | Oct. 1, 1946 |
| 2,414,101 | Hogan et al. | Jan. 14, 1947 |
| 2,636,936 | Goldsmith | Apr. 28, 1953 |
| 2,664,460 | Roschke | Dec. 29, 1953 |
| 2,686,831 | Dome | Aug. 17, 1954 |